(No Model.)
H. P. MORGAN.
FISHING ROD.
No. 472,766. Patented Apr. 12, 1892.
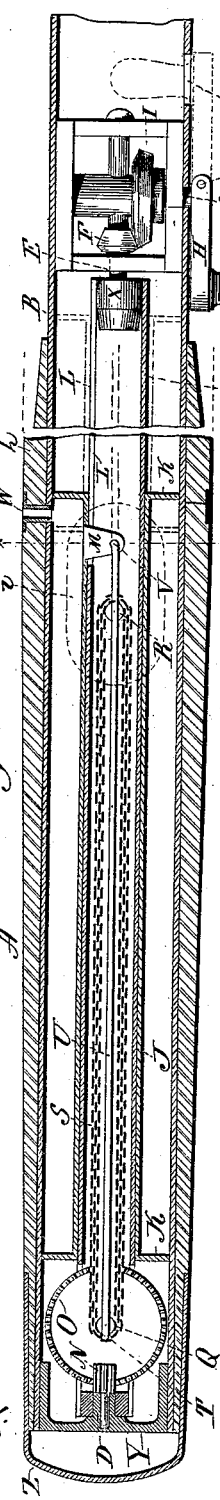

UNITED STATES PATENT OFFICE.

HENRY P. MORGAN, OF SOUTH NORWALK, CONNECTICUT.

FISHING-ROD.

SPECIFICATION forming part of Letters Patent No. 472,766, dated April 12, 1892.

Application filed November 30, 1891. Serial No. 413,547. (No model.)

*To all whom it may concern:*

Be it known that I, HENRY P. MORGAN, of South Norwalk, in the county of Fairfield and State of Connecticut, have invented a new Improvement in Fishing-Rods; and I do hereby declare the following, when taken in connection with accompanying drawings and the letters of reference marked thereon, to be a full, clear, and exact description of the same, and which said drawings constitute part of this specification, and represent, in—

Figure 1, a side view of the butt portion of the rod complete; Fig. 2, a longitudinal central section of the same, illustrating the mechanism; Fig. 3, a longitudinal central section of the tubular shaft removed, showing the gear and sprocket wheels for imparting longitudinal movement to the spool; Fig. 4, a transverse section cutting on line $x$ $x$ of Fig. 2; Fig. 5, a transverse section cutting on line $x$ $x$ of Fig. 3, enlarged; and Figs. 6, 7, 8, and 9, modifications.

This invention relates to an improvement in fishing-rods, it having for its object the combination of a reel made substantially as a permanent part of but within the rod; and it consists in the construction and arrangement of mechanism, as hereinafter described, and particularly recited in the claims.

In outline the rod is of the usual form. In the illustration only the butt portion of the rod is shown. This portion of the rod consists of a tube B, which may be inclosed with wood or any suitable material, as shown, for the convenience of handling or for the appearance of the rod, and the tube is preferably inclosed by a sleeve A of wood or other suitable material, or the covering for the tube may be omitted. The tube is of substantially cylindrical shape, and longitudinally within the tube B a tubular shaft C is arranged, supported at the butt-end upon a gudgeon D, made stationary in that end of the rod, as seen in Figs. 2 and 3, but yet so that the shaft may revolve freely upon this gudgeon as a bearing. At the other end the shaft C is supported in a bearing E, this end of the shaft being reduced so as to form a solid shaft, and it carries at that end a bevel-pinion F. The bearing E is in a frame-work arranged within the tube, as clearly seen in Fig. 2, and through this frame-work in suitable bearings is a shaft G, which extends through the tube B on one side, and is there provided with a crank H by which the transverse shaft G may be rotated by the application of the hand upon the outside in a similar manner to imparting the revolution to an ordinary fishing-reel spool. The transverse shaft G carries a bevel-pinion I, which works into the bevel-pinion F on the end of the tubular shaft C, and so that revolution imparted to the transverse shaft G through the crank H will be in like manner imparted to the longitudinal tubular shaft C.

Upon the tubular shaft C the spool J is arranged. This spool consists of a tubular body, its internal diameter corresponding to the external diameter of the tubular shaft C, and so as to freely slide longitudinally thereon from the butt-end forward, as represented in broken lines, and return. At each end the spool is provided with a head K, and so that the line may be wound upon the body of the spool between the heads. In order that the spool may partake of the rotary movement of the shaft C, the shaft is constructed with a longitudinal groove L on one side, (see Figs. 3 and 4,) and through that groove an arm M on the spool extends, this arm being made fast to the spool and works through the groove L, as seen in Fig. 4, and moves longitudinally therein with the spool, and thus couples the spool and the shaft together, as by a spline and groove, so that the rotative movement imparted to the shaft, as before described, the spool must necessarily revolve with it.

To impart the before-mentioned longitudinal movement to the spool J a stationary pinion N is formed on the gudgeon D at the butt-end of the shaft, and at that end of the shaft a gear-wheel O is arranged upon a transverse axis P, and the teeth of the gear O mesh into the teeth of the stationary pinion N. Consequently as the shaft revolves the gear O, revolving with it and also adapted to revolve upon its own axis, will be caused to so revolve upon its own axis because of its engagement with the stationary pinion N, and thus an independent revolution on its own axis will be imparted to the gear O as the shaft revolves.

On the hub of the gear O is a sprocket-wheel Q, and within the shaft forward a corresponding sprocket-wheel R is arranged, and running around the sprocket-wheels Q and R is an endless chain S, forming a band, which under the revolution of the gear O will be caused to travel one run of the chain forward and the other run of the chain rearward. At one end at a point T on the chain a rod U is hung. The rod extending forward within the shaft is hung by its other end to the arm M, as at V. (See Fig. 2.) The rod U, being thus attached by one end to the endless chain, will travel with that chain and be forced forward on one run of the chain and returned on the other. Consequently as the rod is connected to the spool a corresponding forward movement will be imparted to the spool, as indicated in broken lines, Fig. 2, and then the spool will return to its rear position.

At one point in proper relation to the spool an opening W is made from the outside through into the tube B and within the limits of movement of the respective heads of the spool. Through this opening the line is passed and engaged with the spool. Then by turning the crank H the spool is caused to revolve, and the line will be correspondingly drawn into the rod and wound upon the spool. The spool advances, as before described, as the line is wound from the forward head toward the rear head, and then the spool returns for a second layer, and so on, the spool moving backward and forward until the entire or desired amount of line is wound onto the spool.

It is desirable to make the spool and shaft removable. To this end the shaft C is made separable from its extreme forward or bearing portion. That bearing portion is constructed with a head X, corresponding to the internal diameter of the shaft and so as to readily couple therewith, and at its extreme rear end is made somewhat tapering, as shown, so that the tubular shaft when moved forward may readily pass onto the said part X and couple therewith, so that the shaft will revolve with the pinion F, as before described. At the rear end the gudgeon is formed as a part of a head Y, which is removable from the tube B, and that head Y being removed the shaft B, with the spool, may be withdrawn. A removable cap Z is applied to the butt-end of the rod to inclose the head Y and form the usual finish for that end of the rod.

It is desirable that the crank may be substantially removed, so as to avoid the projection of the handle of the crank when the rod is not in use. To this end the crank is hinged, preferably, to the transverse shaft G, as at $a$, and so that it may swing thereon and be turned forward, and the tube is constructed with an opening $b$, through which the handle of the crank may pass into the tube, as represented in broken lines, Fig. 2, and so that the crank may be thus turned out of the way and yet remain in a convenient position for use when required. Another advantage of this turning of the crank is that when the crank is so turned forward the rotation of the transverse shaft G is prevented, and the reel is therefore locked against possible rotation under draft upon the line.

Instead of making the opening through into the tube for the handle of the crank to pass, as described, it may be made as seen in Fig. 6. In this case the crank $d$ is made fast to the shaft and the handle $e$ is hinged to the end of the crank-arm, as at $f$, so that it may be turned into a longitudinal line with the crank $d$, as represented in broken lines. The corresponding side of the tube may be recessed, as at $g$, to receive the handle, so that it may lie flush with the plane of the crank itself.

The line may be connected to the spool by withdrawing the spool, as before described, then passing the line through the opening W through the rear end of the tube, connect it with the detached spool, then the spool and shaft replaced, and the line wound upon the spool; but I prefer to construct that portion $h$ of the sleeve A forward of the opening W, detached from the rear portion, and so that it may slide forward on the tube B, as indicated in broken lines, Fig. 2, and thereby expose an opening $i$ through the tube, (indicated in broken lines,) through which the spool will be exposed, and so that the line may be passed through the opening W and then engaged with the spool so as to be wound thereon, as before described, and then the sleeve returned to close the opening.

While preferring to rotate the shaft by the mechanism which I have described, it will be evident that it may be rotated by the application of a crank at the butt-end, as seen in Fig. 7, and it will also be evident that the longitudinal movement may be otherwise imparted to the spool—as, for illustration, the tube B may be constructed with a longitudinal slot $k$, as seen in Fig. 8, and a slide $l$ arranged therein to engage one head of the spool, and so that a thumb or finger applied to the slide $l$ to move it will correspondingly move the spool—or the spool may be operated without longitudinal movement—that is, longitudinally stationary—by constructing the tube with a longitudinal slot $m$, (see Fig. 9,) like the slot $k$ in the last illustration, and running the line through that slot to the spool, as seen in Fig. 9. In this case the line will be guided by hand.

It will be evident that for the sprocket-wheels and endless chain any of the known equivalents—as a band and pulleys—may be substituted therefor. By the term "sprocket-wheel and chain" I wish to be distinctly understood as embodying all substantial equivalents therefor.

I claim—

1. A fishing-rod having the butt-end made tubular, a tubular shaft arranged therein, mechanism, substantially such as described, for imparting rotation to said shaft, combined with a spool arranged on said shaft, but free for longitudinal movement thereon, a pinion stationary within the said tube, a gear arranged in said shaft upon an axis at right angles to the axis of said shaft and adapted to work into the said stationary pinion, whereby the rotation of the shaft will impart rotation to said gear, the said gear carrying a sprocket-wheel within the said shaft, a corresponding sprocket-wheel arranged upon an axis within the said shaft forward of the sprocket-wheel on the said gear, with an endless chain around said sprocket-wheels, the said shaft constructed with a longitudinal slot forward of said sprocket-wheels, and a rod hung by one end to said chain and so as to travel therewith and the other end of the said rod hung to the said spool through said slot in the shaft, substantially as and for the purpose described.

2. A fishing-rod having the butt portion made tubular, a longitudinal shaft arranged therein, mechanism, substantially such as described, to impart rotation to said shaft, a spool arranged on said shaft, adapted to revolve therewith, but free for longitudinal movement, an opening through which the line may pass to said spool, and the tube constructed with an opening through its side independent of the line-opening and through which the said spool may be reached, substantially as and for the purpose described.

3. A fishing-rod having the butt portion made tubular, a longitudinal shaft arranged therein, mechanism, substantially such as described, to impart rotation to said shaft, a spool arranged on said shaft, adapted to revolve therewith, but free for longitudinal movement, an opening through which the line may pass to said spool, and the tube constructed with an opening through its side by which the said spool may be reached, with a sleeve arranged to slide longitudinally upon said tube and over said opening, substantially as and for the purpose described.

In testimony whereof I have signed this specification in the presence of two subscribing witnesses.

HENRY P. MORGAN.

Witnesses:
L. D. WILDMAN,
J. E. SLATER.